United States Patent
Zha

(10) Patent No.: US 11,388,101 B2
(45) Date of Patent: Jul. 12, 2022

(54) BIT BLOCK PROCESSING METHOD AND NODE

(71) Applicant: Huawei Technologies Co., Ltd., Shenzhen (CN)

(72) Inventor: Min Zha, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 178 days.

(21) Appl. No.: 16/862,170

(22) Filed: Apr. 29, 2020

(65) Prior Publication Data

US 2020/0259757 A1 Aug. 13, 2020

Related U.S. Application Data

(63) Continuation of application No. PCT/CN2018/112599, filed on Oct. 30, 2018.

(30) Foreign Application Priority Data

Oct. 31, 2017 (CN) .......................... 201711050231.3

(51) Int. Cl.
*H04L 47/34* (2022.01)
*H04L 47/36* (2022.01)

(52) U.S. Cl.
CPC .............. *H04L 47/34* (2013.01); *H04L 47/36* (2013.01)

(58) Field of Classification Search
CPC ................................ H04L 47/34; H04L 47/36
See application file for complete search history.

(56) References Cited

U.S. PATENT DOCUMENTS

2002/0085563 A1* 7/2002 Mesh ............... H04J 3/1617
 370/466
2003/0152062 A1 8/2003 Terry et al.
(Continued)

FOREIGN PATENT DOCUMENTS

| CN | 2696247 Y | 4/2005 |
|---|---|---|
| CN | 101267210 A | 9/2008 |
| CN | 103401663 A | 11/2013 |
| CN | 104243346 A | 12/2014 |

OTHER PUBLICATIONS

Kim et al., "Preemptive Switched Ethernet for Real-time Process Control System," 2013 11th IEEE International Conference on Industrial Informatics (INDIN), IEEE, pp. 171-176, XP032498252, Institute of Electrical and Electronics Engineers, New York, New York (Jul. 29, 2013).

(Continued)

*Primary Examiner* — Chi H Pham
*Assistant Examiner* — Weibin Huang
(74) *Attorney, Agent, or Firm* — Leydig, Voit & Mayer, Ltd.

(57) ABSTRACT

Embodiments of the present invention provide a bit block processing method. The method includes: sequentially receiving a first tag bit block and N data bit blocks through a first port, where the first tag bit block includes a first length field; sequentially sending the first tag bit block and M data bit blocks in the N data bit blocks through a second port; and sequentially sending a second tag bit block and L data bit blocks in the remaining N–M data bit blocks of the N data bit blocks through the second port, where the second tag bit block includes a second length field, a value of the first length field is greater than a value of the second length field by M, and M, N, and L are all integers greater than or equal to 0.

17 Claims, 10 Drawing Sheets

(56) References Cited

U.S. PATENT DOCUMENTS

| | | |
|---|---|---|
| 2005/0047346 A1 | 3/2005 | Terry et al. |
| 2008/0009289 A1 | 1/2008 | Kashima et al. |
| 2009/0067429 A1* | 3/2009 | Nagai .................. H04L 49/3009 370/465 |
| 2010/0191922 A1* | 7/2010 | Dickey .................... G06F 3/064 711/E12.001 |
| 2010/0278040 A1* | 11/2010 | He .......................... H04L 47/34 370/222 |
| 2011/0261814 A1 | 10/2011 | Matthews et al. |
| 2011/0289125 A1* | 11/2011 | Guthery ................ G06F 12/023 707/E17.007 |
| 2015/0003321 A1* | 1/2015 | Burchill .............. H04L 47/6275 370/328 |
| 2015/0117177 A1 | 4/2015 | Ganga et al. |
| 2018/0234309 A1* | 8/2018 | Li .......................... H04L 43/50 |

OTHER PUBLICATIONS

Thiele et al., "Formal Worst-Case Performance Analysis of Time-Sensitive Ethernet with Frame Preemption," 2016 IEEE 21st International Conference on Emerging Technologies and Factory Automation (ETFA), IEEE, pp. 1-9, XP032994708, Institute of Electrical and Electronics Engineers, New York, New York (Sep. 6, 2016).

Flores et al.,"Performance analysis of the Disrupted Static Priority scheduling for AFDX," 2014 Twelfth ACM/IEEE Conference on Formal Methods and Models for Codesign (MEMOCODE), IEEE, pp. 94-103, XP032688225, Institute of Electiical and Electronics Engineers, New York, New York (Oct. 19, 2014).

* cited by examiner

TO
FIG. 2B

| 8 octets with T/RXC | 0 0 | 0 0 1 | 0 0 0 0 0 0 0 0 2 3 4 5 6 7 8 9 | | | | | | | | | |
|---|---|---|---|---|---|---|---|---|---|---|---|---|
| | 0 0 | 0 1 | D0 | | | | | | | | | |
| | | 1 0 | 0x1E | D7 | D6 | D5 | D4 | D3 | D2 | D1 | D0 | |
| | | 1 0 | 0x2D | C7 | C6 | C5 | C4 | C3 | C2 | C1 | C0 | |
| | | 1 0 | 0x33 | D7 | D6 | D5 | O4 | C3 | C2 | C1 | C0 | |
| | | 1 0 | 0x66 | D7 | D6 | D5 | S4 | C3 | C2 | C1 | C0 | |
| | | 1 0 | 0x55 | D7 | D6 | D5 | S4 | D3 | D2 | D1 | O0 | |
| | | 1 0 | 0x78 | D7 | D6 | D5 | O4 | D3 | D2 | D1 | S0 | |
| | | 1 0 | 0x4B | D7 | D6 | D5 | D4 | D3 | D2 | D1 | O0 | |
| | | 1 0 | 0x87 | C7 | C6 | C5 | C4 | C3 | C2 | C1 | T0 | |
| | | 1 0 | 0x99 | C7 | C6 | C5 | C4 | C3 | T2 | T1 | D0 | |
| | | 1 0 | 0xAA | C7 | C6 | C5 | C4 | T3 | D2 | D1 | D0 | |
| | | 1 0 | 0xB4 | C7 | C6 | C5 | T4 | D3 | D2 | D1 | D0 | |
| | | 1 0 | 0xCC | C7 | C6 | T5 | D4 | D3 | D2 | D1 | D0 | |
| | | 1 0 | 0xD2 | C7 | T6 | D5 | D4 | D3 | D2 | D1 | D0 | |
| | | 1 0 | 0xE1 | T7 | D6 | D5 | D4 | D3 | D2 | D1 | D0 | |
| | | 1 0 | 0xFF | | | | | | | | | |
| | | 1 0 | Reserved | | | | | | | | | |

| 2.5/5 10 GE | 40 GE 100 GE | CPRI |
|---|---|---|
| Valid | Valid | Valid |
| Valid | Valid | Invalid |
| Valid | Invalid | Invalid |
| Valid | Invalid | Invalid |
| Valid | Invalid | Invalid |
| Valid | Invalid | Invalid |
| Valid | Valid | Valid |
| Valid | Valid | Invalid |
| Valid | Valid | Invalid |
| Valid | Valid | Invalid |
| Valid | Valid | Invalid |
| Valid | Valid | Invalid |
| Valid | Valid | Invalid |
| Valid | Valid | Valid |

CONT. FROM FIG. 2B

FIG. 2C

BIT BLOCK PROCESSING METHOD AND NODE

CROSS-REFERENCE TO RELATED APPLICATIONS

This application is a continuation of International Application No. PCT/CN2018/112599, filed on Oct. 30, 2018, which claims priority to Chinese Patent Application No. 201711050231.3, filed on Oct. 31, 2017. The disclosures of the aforementioned applications are hereby incorporated by reference in their entireties.

TECHNICAL FIELD

The present disclosure relates to the field of communications technologies, and in particular, to a bit block processing method and node.

BACKGROUND

Currently, Ethernet technologies are widely used. Future new services such as a 5G mobile bearer and industrial Internet impose new requirements on Ethernet such as, for example, higher requirements for a low latency, certainty, and high reliability.

In the prior art, an Ethernet frame preemption technology is used to decrease a latency of critical traffic. However, due to restriction by a shortest packet in the Ethernet, a decrease in the latency is limited. In the prior art, a bit block cannot be truncated at a physical layer.

SUMMARY

Embodiments of the present disclosure provide a bit block processing method and node, to resolve a problem that a bit block cannot be truncated at a physical layer.

According to a first aspect, a bit block processing method is provided, the method including: sequentially receiving a first tag bit block and N data bit blocks through a first port, where the first tag bit block includes a first length field; sequentially sending the first tag bit block and M data bit blocks in the N data bit blocks through a second port; and sequentially sending a second tag bit block and L data bit blocks in remaining N−M data bit blocks of the N data bit blocks through the second port, where the second tag bit block includes a second length field, a value of the first length field is greater than a value of the second length field by M, and M, N, and L are all integers greater than or equal to 0.

According to the method provided in this embodiment of the present disclosure, a tag bit block is added, and the tag bit block carries a length field. The tag bit block and data bit blocks following the tag bit block form a bit block segment. During forwarding of the bit block segment, the bit block segment may be truncated into at least two bit block segments. Each truncated bit block segment includes one tag bit block, and a value of a length field of the tag bit block is related to a quantity of truncated data bit blocks.

In a possible design, before the sequentially sending a second tag bit block and L data bit blocks in the remaining N−M data bit blocks of the N data bit blocks through the second port, the method further includes: obtaining a third tag bit block and O data bit blocks, where O is an integer greater than or equal to 0; and sequentially sending the third tag bit block and the O data bit blocks through the second port.

In a possible design, the first tag bit block further includes a first connection identity field, and before the sequentially sending the first tag bit block and M data bit blocks in the N data bit blocks through a second port, the method further includes: determining the second port based on the first connection identity field.

In a possible design, the second tag bit block further includes a second connection identity field, and a value of the first connection identity field is the same as a value of the second connection identity field.

In a possible design, the first tag bit block further includes a first sequence number field, the second tag bit block further includes a second sequence number field, and a value of the first sequence number field is the same as a value of the second sequence number field.

In a possible design, the first tag bit block further includes a first sequence number start field used to identify whether the first data bit block in the N data bit blocks is the first data bit block corresponding to a sequence number, and the second tag bit block further includes a second sequence number start field used to identify whether the first data bit block in the L data bit blocks is the first data bit block corresponding to the sequence number.

In a possible design, the sequentially sending the first tag bit block and M data bit blocks in the N data bit blocks through a second port further includes: storing the value of the first length field, and subtracting 1 from the stored value of the first length field each time one data bit block is sent.

In a possible design, the value of the second length field is the stored value of the first length field.

In a possible design, if the stored value of the first length field is 0, the stored first length field is released.

In a possible design, the sequentially receiving a first tag bit block and N data bit blocks through a first port includes: sequentially receiving the first tag bit block, the N data bit blocks, and a first tag end bit block through the first port; and after the sequentially sending a second tag bit block and L data bit blocks in the remaining N−M data bit blocks of the N data bit blocks through the second port, the method further includes: after the first tag end bit block is sent through the second port, releasing the stored first length field.

According to a second aspect, a bit block processing method is provided, the method including: generating a first tag bit block, where the first tag bit block includes a first length field; obtaining N to-be-sent data bit blocks; and sequentially sending the first tag bit block and the N data bit blocks through a first port, where N is an integer greater than or equal to 0.

In a possible design, a value of the first length field is N.

In a possible design, a value of the first length field is a first preset value, and the sequentially sending the first tag bit block and the N data bit blocks through a first port includes: sequentially sending the first tag bit block, the N data bit blocks, and a first tag end bit block through the first port.

In a possible design, the first tag bit block further includes at least one of a first connection identity field, a first sequence number field, and a first sequence number start field, the first connection identity field is used to route the first tag bit block and the N data bit blocks, the first sequence number field is used to identify a sequence number corresponding to the N data bit blocks, and the first sequence number start field is used to identify whether the first data bit block in the N data bit blocks is the first data bit block corresponding to the sequence number.

In a possible design, the first tag bit block further includes a first sequence number field, the first tag end bit block further includes a first end sequence number field, and a value of the first sequence number field is the same as a value of the first end sequence number field.

According to a third aspect, a bit block processing method is provided, the method including: sequentially receiving a first tag bit block and N data bit blocks, where the first tag bit block includes a first length field; sequentially receiving a second tag bit block and M data bit blocks, where the second tag bit block includes a second length field; and associating the N data bit blocks with the M data bit blocks if a value of the first length field is greater than a value of the second length field by N, where N and M are integers greater than or equal to 0.

In a possible design, the first tag bit block further includes a first sequence number field, the second tag bit block further includes a second sequence number field, and the associating the N data bit blocks with the M data bit blocks if a value of the first length field is greater than a value of the second length field by N includes: if the value of the first length field is greater than the value of the second length field by N, and a value of the first sequence number field is the same as a value of the second sequence number field, associating the N data bit blocks with the M data bit blocks.

In a possible design, the first tag bit block further includes a first sequence number start field, the second tag bit block further includes a second sequence number start field, and the method further includes: determining the first data bit block corresponding to a sequence number based on a value of the first sequence number start field and a value of the second sequence number start field.

In a possible design, the method further includes: if the value of the second length field is M, determining that the last data bit block in the M data bit blocks is the last data bit block corresponding to the sequence number.

In a possible design, the sequentially receiving a second tag bit block and M data bit blocks includes: sequentially receiving the second tag bit block, the M data bit blocks, and a second tag end bit block, and determining, based on the second tag end bit block, that the last data bit block in the M data bit blocks is the last data bit block corresponding to the sequence number.

According to a fourth aspect, a node is provided, the node including: a receiving module, configured to sequentially receive a first tag bit block and N data bit blocks through a first port, where the first tag bit block includes a first length field; and a sending module, configured to sequentially send the first tag bit block and M data bit blocks in the N data bit blocks through a second port, and further sequentially send a second tag bit block and L data bit blocks in the remaining N−M data bit blocks of the N data bit blocks through the second port, where the second tag bit block includes a second length field, a value of the first length field is greater than a value of the second length field by M, and M, N, and L are all integers greater than or equal to 0.

In a possible design, the receiving module is further configured to obtain a third tag bit block and O data bit blocks, where O is an integer greater than or equal to 0; and before sequentially sending the second tag bit block and the L data bit blocks in the remaining N−M data bit blocks of the N data bit blocks through the second port, the sending module is further configured to sequentially send the third tag bit block and the O data bit blocks through the second port.

In a possible design, the first tag bit block further includes a first connection identity field, the node further includes a processing module, and the processing module is configured to find the second port based on the first connection identity field.

In a possible design, the second tag bit block further includes a second connection identity field, and a value of the first connection identity field is the same as a value of the second connection identity field.

In a possible design, the first tag bit block further includes a first sequence number field, the second tag bit block further includes a second sequence number field, and a value of the first sequence number field is the same as a value of the second sequence number field.

In a possible design, the first tag bit block further includes a first sequence number start field used to identify whether the first data bit block in the N data bit blocks is the first data bit block corresponding to a sequence number, and the second tag bit block further includes a second sequence number start field used to identify whether the first data bit block in the L data bit blocks is the first data bit block corresponding to the sequence number.

In a possible design, the node further includes a processing module; and when the sending module sequentially sends the first tag bit block and the M data bit blocks in the N data bit blocks through the second port, the processing module is configured to: store the value of the first length field, and subtract 1 from the stored value of the first length field each time one data bit block is sent.

In a possible design, the value of the second length field is the value of the first length field stored by the processing module.

In a possible design, if the stored value of the first length field is 0, the stored first length field is released.

In a possible design, the receiving module is configured to sequentially receive the first tag bit block, the N data bit blocks, and a first tag end bit block through the first port; and after the sending module sends the first tag end bit block through the second port, the processing module is further configured to release the stored first length field.

According to a fifth aspect, a bit block processing node is provided, the node including: a processing module, configured to: generate a first tag bit block, where the first tag bit block includes a first length field; and further obtain N to-be-sent data bit blocks; and a sending module, configured to sequentially send the first tag bit block and the N data bit blocks through a first port, where N is an integer greater than or equal to 0.

In a possible design, a value of the first length field is N.

In a possible design, a value of the first length field is a first preset value, and the sequentially sending the first tag bit block and the N data bit blocks through a first port includes: sequentially sending the first tag bit block, the N data bit blocks, and a first tag end bit block through the first port.

In a possible design, the first tag bit block further includes at least one of a first connection identity field, a first sequence number field, and a first sequence number start field, the first connection identity field is used to route the first tag bit block and the N data bit blocks, the first sequence number field is used to identify a sequence number corresponding to the N data bit blocks, and the first sequence number start field is used to identify whether the first data bit block in the N data bit blocks is the first data bit block corresponding to the sequence number.

In a possible design, the first tag bit block further includes a first sequence number field, the first tag end bit block further includes a first end sequence number field, and a value of the first sequence number field is the same as a value of the first end sequence number field.

According to a sixth aspect, a bit block processing node is provided, the node including: a receiving module, configured to: sequentially receive a first tag bit block and N data bit blocks, where the first tag bit block includes a first length field; and further sequentially receive a second tag bit block and M data bit blocks, where the second tag bit block includes a second length field; and a processing module, configured to associate the N data bit blocks with the M data bit blocks if a value of the first length field is greater than a value of the second length field by N, where N and M are integers greater than or equal to 0.

In a possible design, the first tag bit block further includes a first sequence number field, the second tag bit block further includes a second sequence number field, and the processing module is specifically configured to: if the value of the first length field is greater than the value of the second length field by N, and a value of the first sequence number field is the same as a value of the second sequence number field, associate the N data bit blocks with the M data bit blocks.

In a possible design, the first tag bit block further includes a first sequence number start field, the second tag bit block further includes a second sequence number start field, and the processing module is further configured to determine the first data bit block corresponding to a sequence number based on a value of the first sequence number start field and a value of the second sequence number start field.

In a possible design, the processing module is further configured to: if the value of the second length field is M, determine that the last data bit block in the M data bit blocks is the last data bit block corresponding to the sequence number.

In a possible design, the receiver is specifically configured to sequentially receive the second tag bit block, the M data bit blocks, and a second tag end bit block, and the processing module is further configured to determine, based on the second tag end bit block, that the last data bit block in the M data bit blocks is the last data bit block corresponding to the sequence number.

According to a seventh aspect, a bit block processing apparatus is provided, the apparatus including a processing module and a memory, where the memory is configured to store a program, and the processing module invokes the program stored in the memory, to perform the method provided in the first aspect of the present disclosure.

According to an eighth aspect, a bit block processing apparatus is provided, the apparatus including a processing module and a memory, where the memory is configured to store a program, and the processing module invokes the program stored in the memory, to perform the method provided in the second aspect of the present disclosure.

According to a ninth aspect, a bit block processing apparatus is provided, the apparatus including a processing module and a memory, where the memory is configured to store a program, and the processing module invokes the program stored in the memory, to perform the method provided in the third aspect of the present disclosure.

According to a tenth aspect, a service data transmission apparatus is provided, the apparatus including at least one processing element (or chip) configured to perform the method in the first aspect.

According to an eleventh aspect, a service data transmission apparatus is provided, the apparatus including at least one processing element (or chip) configured to perform the method in the second aspect.

According to a twelfth aspect, a service data transmission apparatus is provided, the apparatus including at least one processing element (or chip) configured to perform the method in the third aspect.

According to a thirteenth aspect, a computer storage medium is provided, the computer storage medium including a program, configured to perform the method in the first aspect.

According to a fourteenth aspect, a computer storage medium is provided, the computer storage medium including a program, configured to perform the method in the second aspect.

According to a fifteenth aspect, a computer storage medium is provided, the computer storage medium including a program, configured to perform the method in the third aspect.

BRIEF DESCRIPTION OF DRAWINGS

FIG. 2A to FIG. 2C are a schematic diagram of a code type definition in PCS layer coding according to an embodiment of the present disclosure;

FIG. 5B-1 and FIG. 5B-2 are a schematic flowchart of still another bit block processing method according to an embodiment of the present disclosure;

DESCRIPTION OF EMBODIMENTS

The following describes the embodiments of the present disclosure with reference to accompanying drawings.

Figure 1:
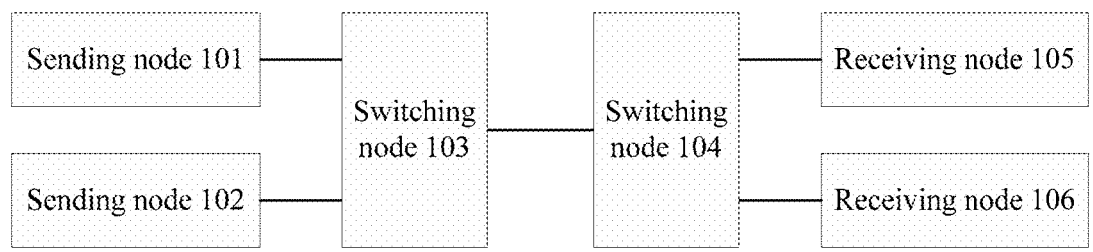
FIG. 1 is a schematic structural diagram of a system according to an embodiment of the present disclosure.

FIG. 1 is a schematic structural diagram of a system according to an embodiment of the present disclosure, and the system includes sending nodes 101 and 102, switching nodes 103 and 104, and receiving nodes 105 and 106. The sending nodes, the switching nodes, and the receiving nodes may be devices of a same type, but different nodes process a specific service flow differently. For example, for some service flows, the sending node 101 may be a switching node, or may be a receiving node.

It is assumed that the sending node 101 sends a first Ethernet frame to the switching node 103. The first Ethernet frame needs to reach the switching node 104 through forwarding by the switching node 103, and is forwarded to the receiving node 105 by the switching node 104. It is assumed that the sending node 102 sends a second Ethernet frame to the switching node 103. The second Ethernet frame needs reach the switching node 104 through forwarding by the switching node 103, and is forwarded to the receiving node 106 by the switching node 104. After receiving the first Ethernet frame, the switching node 103 forwards the first Ethernet frame to the switching node 104. In a process of sending the first Ethernet frame, if the switching node 103 receives the second Ethernet frame, and the second Ethernet frame has a higher priority and a higher latency requirement, a service-preemption-based sending may be performed. That is, the second Ethernet frame may be sent through preemption before the first Ethernet frame. In the prior art, an Ethernet-frame-based preemption technology may be used to truncate, for example, the first Ethernet frame. However, there is a limitation on a shortest packet of the first Ethernet frame, that is, the first Ethernet frame can be truncated only after a length of the sent first Ethernet frame meets a truncation requirement, and then the second Ethernet frame can be sent; and a remaining part of the first Ethernet frame can be sent after the second Ethernet frame is sent.

For service-preemption-based sending, for example, the first Ethernet frame belongs to best effort traffic. The traffic is traffic of a service that ensures lowest performance, and the traffic requires only that a network sends a packet by making best efforts, and has no requirement for performance such as a latency and reliability. The second Ethernet frame belongs to critical traffic, and the traffic is traffic for which a latency and certainty need to be ensured.

To send an Ethernet frame in a communications network, bit block encoding needs to be performed at a physical layer to form a series of encoded bit blocks. For example, a manner of a combination of 8B/10B encoding and NRZ encoding is used in gigabit Ethernet, and 64B/66B encoding is used in 10-gigabit Ethernet. These 8B/10B code blocks or 64B/66B code blocks at an Ethernet physical layer are encoded bit blocks. In the communications network, a receive end needs to recover clock information from received data to ensure synchronization, and this requires that there are enough hops in a binary code stream transmitted on a line, that is, there cannot be excessive consecutive high levels or low levels; otherwise, the clock information cannot be extracted. This is also a reason for performing bit block coding at the physical layer.

Figure 2B:
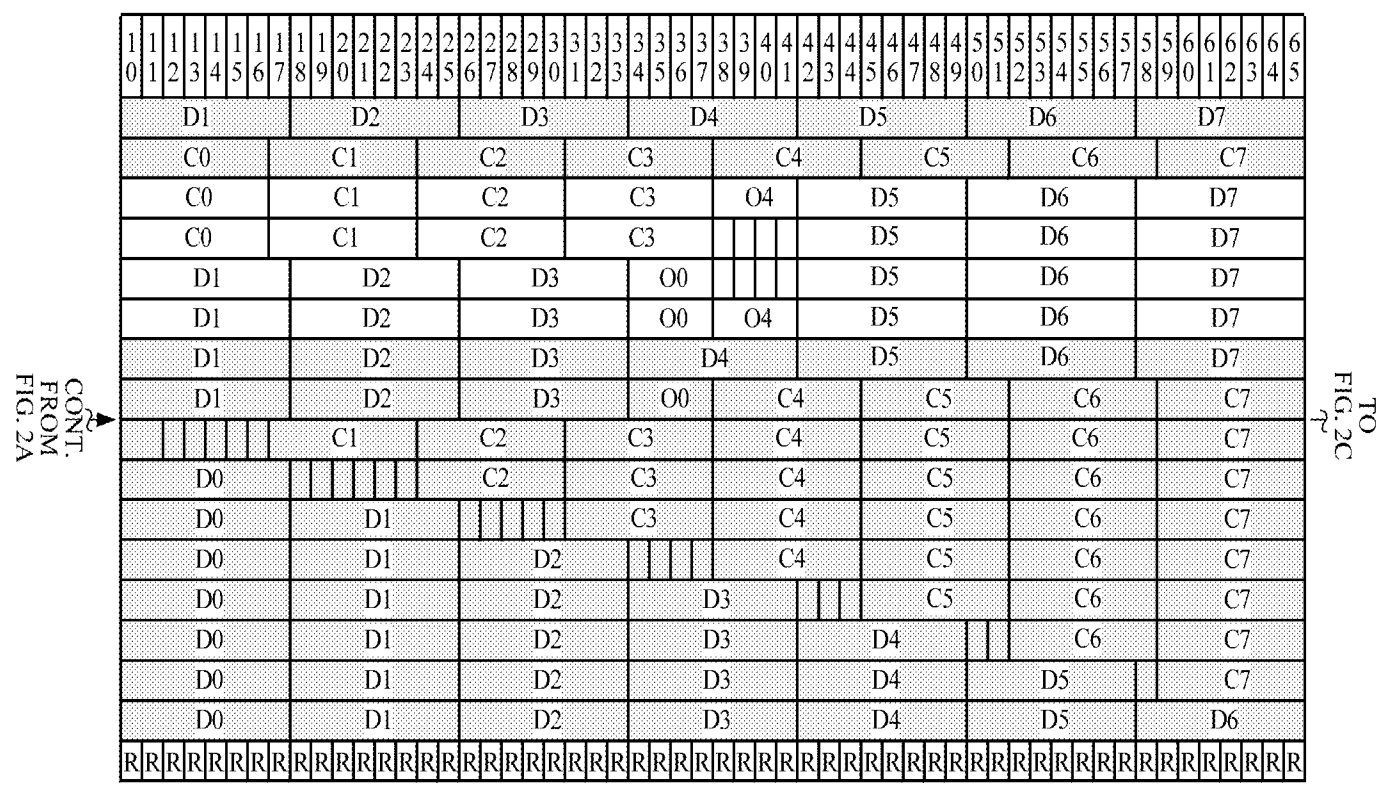

FIG. 2A to FIG. 2C are a schematic diagram of a code type definition in PCS layer coding according to an embodiment of the present disclosure. FIG. 2A to FIG. 2C show 64B/66B encoding, where two bits "10" or "01" in a header are 64B/66B bit block synchronization header bits, and the last 64 bits are used to carry payload data or a protocol. Each row represents a code type definition of a type of bit block, where D0 to D7 represent data bytes, C0 to C7 represent control bytes, S0 represents a start byte, and T0 to T7 represent end bytes. In the first row, a synchronization header bit is "01", and the following bytes are all data bytes. Synchronization bits in the second, third, and fourth rows are "10", where the second row is mainly used for frequency offset adaptation, and bit blocks in the third and fourth rows are no longer supported at 40 GE or a higher rate. Bit blocks in the fifth, sixth, and eighth rows are bit blocks of an ordered set (OS) code and are mainly used for operation and maintenance management, and synchronization bits in the fifth, sixth, and eighth rows are "10". The bit blocks in the fifth and sixth rows are no longer supported at 40 GE or a higher rate. Bit blocks in the seventh row are start bit blocks, and synchronization header bits in the seventh row are "10". Bit blocks in the ninth to 16th rows are eight types of end bit blocks, and synchronization header bits in the ninth to 16th rows are "10".

The bit block in this embodiment of the present disclosure is an M1/M2 bit block, where an M1/M2 bit represents a coding scheme, M1 represents a quantity of payload bits in each bit block, M2 represents a total quantity of bits in each encoded bit block, M1 and M2 are positive integers, and M2>M1.

In the embodiments of the present disclosure, priority-based preemption is based on a physical layer bit block instead of Ethernet frame truncation at a MAC layer.

Figure 3:
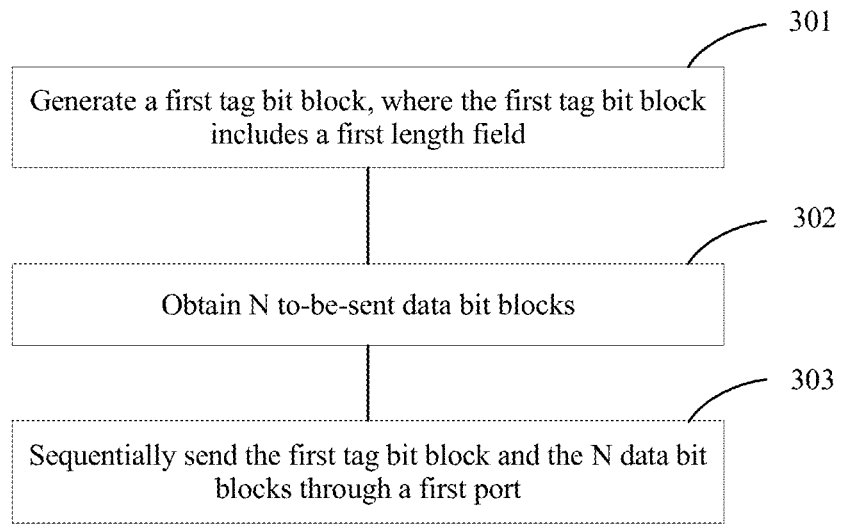
FIG. 3 is a schematic flowchart of a bit block processing method according to an embodiment of the present disclosure.

FIG. 3 is a bit block processing method according to an embodiment of the present disclosure. The method may be applied to sending nodes 101 and 102.

S301. Generate a first tag bit block, where the first tag bit block includes a first length field.

S302. Obtain N to-be-sent data bit blocks.

S303. Sequentially send the first tag bit block and the N data bit blocks through a first port.

This embodiment of the present disclosure provides a tag bit block. The tag bit block carries a length field. The tag bit block may be followed by several data bit blocks, and then is followed by another tag bit block and several data bit blocks following the tag bit block. The length field is related to the several data bit blocks following the another tag bit block. The tag bit block and the several data bit blocks following the tag bit block are referred to as one bit block segment. During sending or forwarding of a bit block segment, the bit block segment may be truncated and sent based on the tag bit block to form at least two new bit block segments. Each new bit block segment includes one tag bit block.

If the sending nodes 101 and 102 are host devices, a data bit block may be directly obtained. If the sending nodes 101 and 102 are intermediate conversion devices, a packet may be received from another node and converted into a data bit block. For example, the packet may be received from a node in a network such as the Ethernet, an optical transport network (OTN) network, or a synchronous digital hierarchy (SDH) network.

In this embodiment of the present disclosure, there may be no sequence between step S301 and step S302, that is, the corresponding first tag bit block may be generated after the N to-be-sent data bit blocks are obtained, or generating the corresponding first tag bit block and obtaining the N to-be-sent data bit blocks may be simultaneously performed.

Optionally, if a quantity of data bit blocks can be obtained when the first tag bit block is generated, a value of the first length field may be set to N when the first tag bit block is generated.

Optionally, if a quantity of data bit blocks cannot be obtained when the first tag bit block is generated, a value of the first length field may be set to a first preset value when the first tag bit block is generated. For example, all bits of the first length field may be set to 1, that is, the value of the first length field is set to a maximum value that can be set. In this case, to ensure that a receiving node can identify the last bit block, a first tag end bit block may be sent after the last bit block in the N data bit blocks is sent. That is, step 303 is specifically: sequentially sending the first tag bit block, the N data bit blocks, and the first tag end bit block through the first port.

Optionally, the first tag bit block may further include at least one of a first connection identity field, a first sequence number field, and a first sequence number start field. The first connection identity field is used to route the first tag bit block and the N data bit blocks, the first sequence number field is used to identify a sequence number corresponding to the N data bit blocks, and the first sequence number start field is used to identify whether the first data bit block in the N data bit blocks is the first data bit block corresponding to the sequence number.

Optionally, the first tag bit block further includes a first sequence number field, the first tag end bit block further includes a first end sequence number field, and a value of the first sequence number field is the same as a value of the first end sequence number field. Certainly, the tag end bit block may alternatively not include a first end sequence number field and only indicate a type of the bit block.

Table 1 shows a tag bit block according to this embodiment of the present disclosure. The bit block uses the bit block of the OS code in the eighth row in FIG. 2A, where bytes D1 and D2 are connection identity (Conn_id) fields, a byte D3 includes a first tag (Ft) field and a length (Len) field, an OS code is set to 4, bytes C4 and C5 are sequence number (Sequence Num) fields, and bytes C6 and C7 are reserved fields. Certainly, the tag bit block may alternatively be generated by using a bit block encoded in another coding scheme, where the length field is mandatory, and other fields are optional. This is not limited in this embodiment of the present disclosure.

TABLE 1

| 1 | 0 | 4B | D1 | D2 | D3 | O | C4 | C5 | C6 | C7 |
|---|---|----|----|----|----|---|----|----|----|----|
| 1 | 0 | 4B | Conn_id | | Ft Len | 4 | Sequence Num | | reserved | |

Table 2 shows a tag end bit block according to this embodiment of the present disclosure. The bit block uses the bit block of the OS code in the eighth row in FIG. 2A, where bytes D1 and D2 are connection identity (Conn_id) fields, a byte D3 is a reserved field, an OS code is set to 5, bytes C4 and C5 are sequence number (Sequence Num) fields, and bytes C6 and C7 are reserved fields. Certainly, the tag end bit block may alternatively be generated by using a bit block encoded in another coding scheme, where only one field may be included and used to indicate that the bit block is a tag end bit block, and other fields are optional. This is not limited in this embodiment of the present disclosure.

TABLE 2

| 1 | 0 | 4B | D1 | D2 | D3 | O | C4 | C5 | C6 | C7 |
|---|---|----|----|----|----|---|----|----|----|----|
| 1 | 0 | 4B | Conn_id | | reserved | 5 | Sequence Num | | reserved | |

Figure 4:
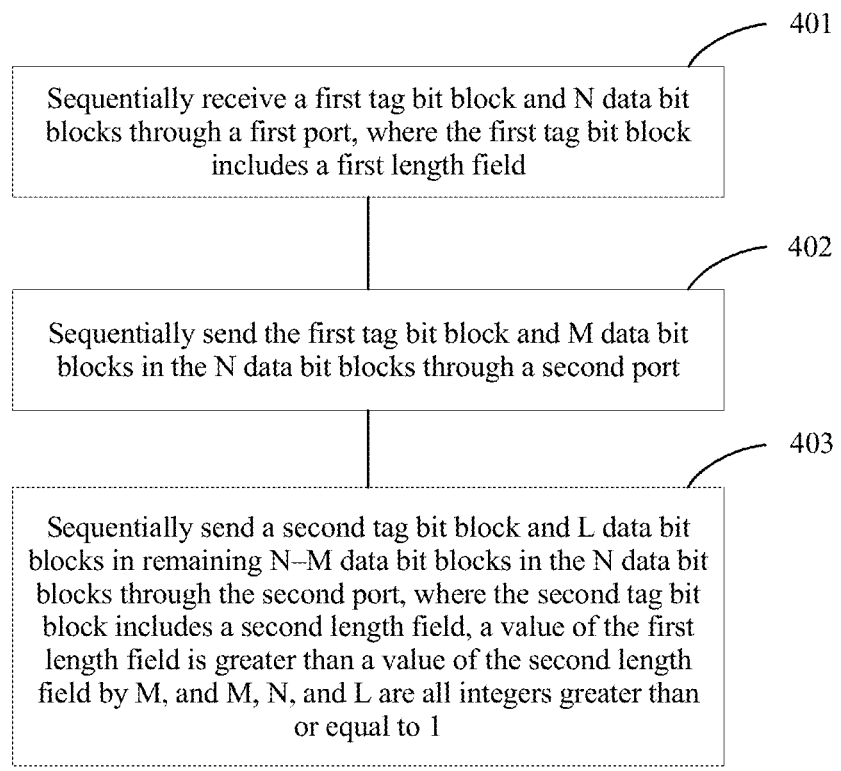
FIG. 4 is a schematic flowchart of another bit block processing method according to an embodiment of the present disclosure.

FIG. 4 is a bit block processing method according to an embodiment of the present disclosure. The method may be applied to switching nodes 103 and 104.

S401. Sequentially receive a first tag bit block and N data bit blocks through a first port, where the first tag bit block includes a first length field.

S402. Sequentially send the first tag bit block and M data bit blocks in the N data bit blocks through a second port.

S403. Sequentially send a second tag bit block and L data bit blocks in the remaining N−M data bit blocks of the N data bit blocks through the second port, where the second tag bit block includes a second length field, a value of the first length field is greater than a value of the second length field by M, and M, N, and L are all integers greater than or equal to 0.

In this embodiment of the present disclosure, the received first tag bit block and N data bit blocks form one bit block segment. A switching node may truncate the bit block segment to generate at least two bit block segments, that is, generating a first bit block segment that includes the first tag bit block and the M data bit blocks in the N data bit blocks and a second bit block segment that includes the second tag bit block and the L data bit blocks in the remaining N−M data bit blocks of the N data bit blocks. The value of the first length field included in the first tag bit block is greater than the value of the second length field included in the second tag bit block by M. Therefore, a receiving node or another node having a need, such as a recombination node, may combine bit block segments based on length field values.

Optionally, the switching node truncates the received bit block segment, that is, can perform preemption to send traffic of another service, for example, critical traffic may be sent. In addition, one bit block segment may be continuously preempted for a plurality of times or intermittently preempted for a plurality of times by a plurality of types of critical traffic. This is not limited in this embodiment of the present disclosure. In some embodiments, the bit block segment may be truncated according to another requirement, for example, a user sets limitation on a length of a bit block segment of a specified node.

Optionally, a third tag bit block and O data bit blocks may be obtained, where O is an integer greater than or equal to 0. After the first tag bit block and the M data bit blocks in the N data bit blocks are sequentially sent through the second port, the third tag bit block and the O data bit blocks may be sequentially sent through the second port, that is, preemption-based sending is performed. A specific implementation of obtaining the third tag bit block and the O data bit blocks may be sequentially receiving the third tag bit block and the O data bit blocks through a third port, or may be: generating, by the switching node, the third tag bit block and the O data bit blocks based on a received Ethernet frame, or generating the third tag bit block and the O data bit blocks based on a local service. Certainly, the third tag bit block and the O data bit blocks may alternatively be generated by using another technology. This is not limited in this embodiment of the present disclosure. In some embodiments, traffic of another service that is sent through preemption may alternatively not include a tag bit block, and includes only a data bit block.

Figure 5A:
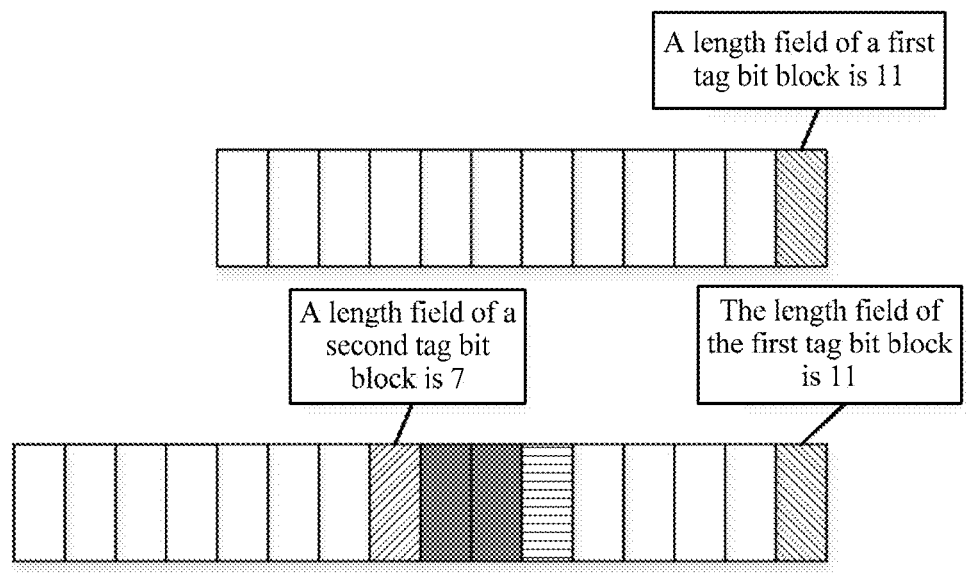
FIG. 5A is a schematic diagram of bit block segment preemption according to an embodiment of the present disclosure.

FIG. 5A is a schematic diagram of bit block segment preemption according to an embodiment of the present disclosure, including an upper part and a lower part, where the upper part is a received bit block segment, and the lower part is a sent bit block segment. The received bit block segment includes a first tag bit block, and a value of a length field is 11. The received bit block segment is divided into two tag bit block segments during sending of the received bit block segment. The first tag bit block segment includes the first tag bit block and four data bit blocks following the first tag bit block. The second tag bit block segment includes a second tag bit block and seven data bit blocks following the second tag bit block. One third tag bit block and two gray data bit blocks may be sent through preemption between the first tag bit block segment and the second tag bit block segment. It may be learned that the received bit block segment may alternatively be divided into more tag bit block segments during sending of the received bit block segment. In subsequent processing by a node, the two sent tag bit block segments may be truncated again, or certainly may be combined and restored into one bit block segment.

Because of preemption, 0 data bit blocks may be sent in step S402, 0 data bit blocks may also be sent in step S403, and 0 data bit blocks may also be received in step S401. In addition, for the third tag bit block and the O data bit blocks that are sent through preemption, because the third tag bit block and the O data bit blocks may also be preempted by a service of a higher priority, a quantity of O may also be 0.

After receiving the first tag bit block and the N data bit blocks in step 401, the switching node needs to determine which port to use to forward the bit blocks. The received first tag bit block may further include one first connection identity field. The second port may be determined based on the field, or may be obtained through table lookup or in another manner. The first connection identity field may be implemented by using the connection identity field of the bytes D1 and D2 in Table 1. If the first tag bit block does not include a connection identity field, the second port may be preconfigured, configured by a network management system, or obtained in other manners.

To ensure that the at least two bit block segments forwarded through the second port can reach the receiving node successfully, the second tag bit block in step 403 may also include a second connection identity field, and a value of the first connection identity field is the same as a value of the second connection identity field.

Optionally, the first tag bit block may further include a first sequence number field, the second tag bit block may further include a second sequence number field, and a value of the first sequence number field is the same as a value of the second sequence number field.

The first tag bit block may further include a first sequence number start field used to identify whether the first data bit block in the N data bit blocks is the first data bit block corresponding to the sequence number, and the second tag bit block may further include a second sequence number start field used to identify whether the first data bit block in the L data bit blocks is the first data bit block corresponding to the sequence number.

Optionally, before the first tag bit block and M data bit blocks in the N data bit blocks are sequentially sent through the second port, the first tag bit block may be stored, or a value of a first length field may be stored. When the first tag bit block and the M data bit blocks in the N data bit blocks are sequentially sent through the second port, the stored value of the first length field is subtracted by 1 each time one data bit block is sent.

When the second tag bit block and the L data bit blocks in the remaining N–M data bit blocks of the N data bit blocks need to be sequentially sent through the second port, the stored value of the first length field may be directly used to generate the second tag bit block.

If the stored value of the first length field is 0, the stored first length field may be released.

If the first tag bit block, the N data bit blocks, and a first tag end bit block are sequentially received through the first port, the stored first length field may be released after the first tag end bit block is sent through the second port.

Figures 1, 5B:
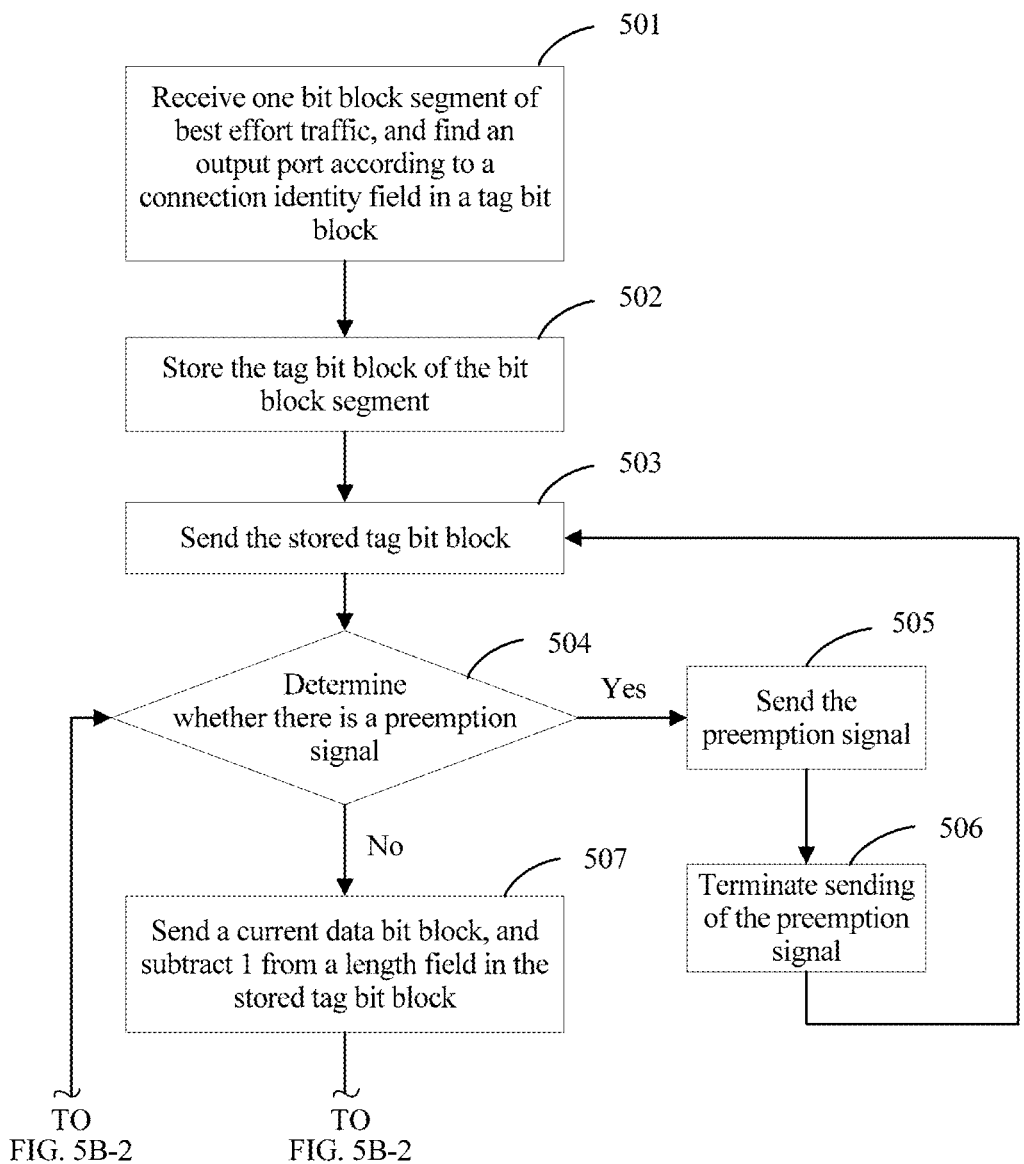
Figures 2, 5B:
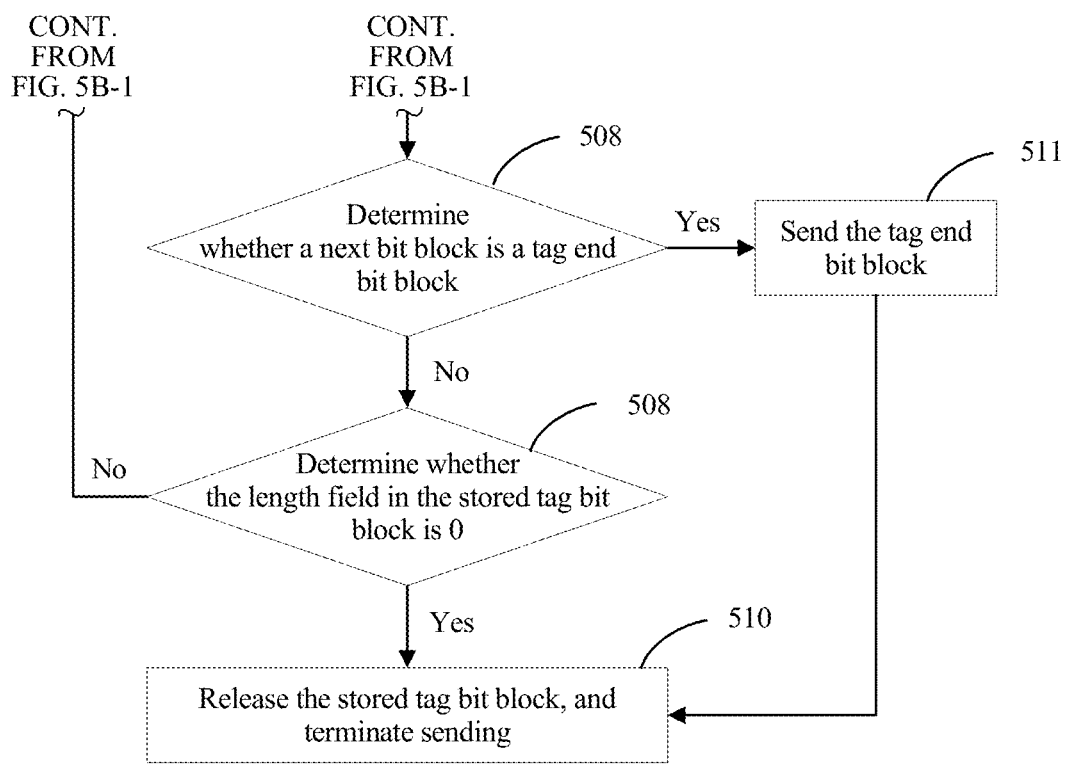

FIG. 5B-1 and FIG. 5B-2 are a bit block processing method according to an embodiment of the present disclosure. The method may be applied to switching nodes 103 and 104.

S501. Receive one bit block of best effort traffic, and determine an output port based on a connection identity field in a tag bit block.

S502. Store the tag bit block in the bit block segment.

S503. Send the stored tag bit block.

S504. Determine whether there is a preemption signal, where if there is a preemption signal, perform step S505, or if there is no preemption signal, perform step S507, that is, if there is a preemption signal, stop sending the best effort traffic, and send preemption critical traffic instead; and after the preemption critical traffic is sent, continue to start performing step S503.

S505. Send the preemption critical traffic.

S506. Perform step S503 after sending the preemption critical traffic is finished.

S507. Send a current data bit block, and subtract 1 from a length field in the stored tag bit block.

S508. Determine whether a next bit block is a tag end bit block, and perform step S511 if the next bit block is a tag end bit block, or perform step S509 if the next bit block is not a tag end bit block.

S509. Determine whether the length field in the stored tag bit block is 0, and perform step S510 if the length field is 0, or perform step S504 if the length field is not 0.

S510. Release the stored tag bit block, and finish sending.

S511. Send the tag end bit block.

Figure 6:
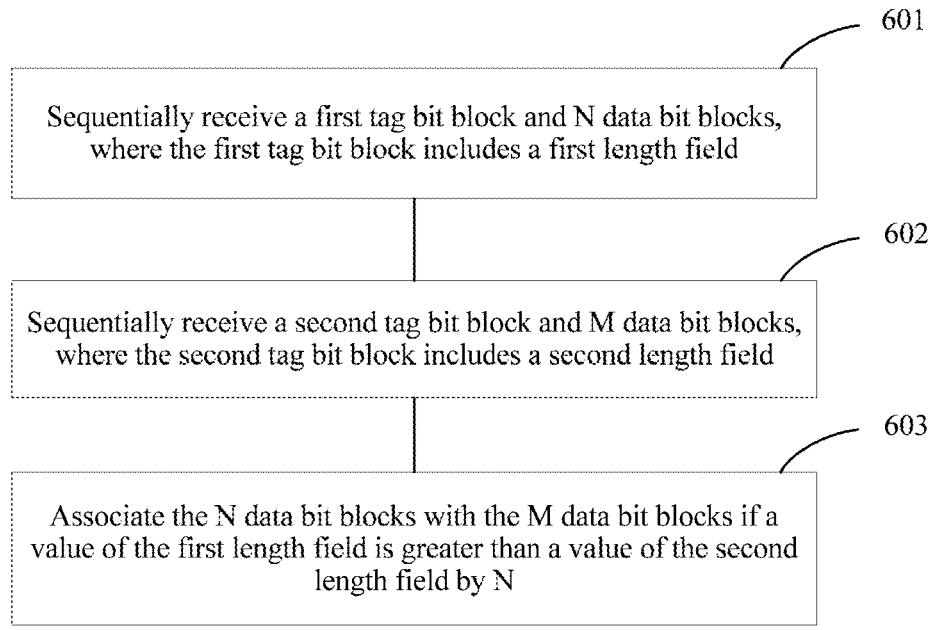
FIG. 6 is a schematic flowchart of still another bit block processing method according to an embodiment of the present disclosure.

FIG. 6 is a bit block processing method according to an embodiment of the present disclosure. The method may be applied to receiving nodes 105 and 106.

S601. Sequentially receive a first tag bit block and N data bit blocks, where the first tag bit block includes a first length field.

S602. Sequentially receive a second tag bit block and M data bit blocks, where the second tag bit block includes a second length field.

S603. Associate the N data bit blocks with the M data bit blocks if a value of the first length field is greater than a value of the second length field by N.

Optionally, the first tag bit block may further include a first sequence number field, and the second tag bit block may further include a second sequence number field. If the value of the first length field is greater than the value of the second length field by N, and a value of the first sequence number field is the same as a value of the second sequence number field, the N data bit blocks are associated with the M data bit blocks.

The first tag bit block may further include a first sequence number start field, the second tag bit block may further include a second sequence number start field, and the first data bit block corresponding to the sequence number is determined based on a value of the first sequence number start field and a value of the second sequence number start field.

If the value of the second length field is M, it is determined that the last data bit block in the M data bit blocks is the last data bit block corresponding to the sequence number.

If the second tag bit block, the M data bit blocks, and a second tag end bit block are sequentially received, it may be determined, based on the second tag end bit block, that the last data bit block in the M data bit blocks is the last data bit block corresponding to the sequence number.

In a specific embodiment, after one bit block segment is received, it may be first determined, based on a value of a sequence number field of a tag bit block, whether a bit block having a same sequence number as the tag bit block has been received previously.

If the bit block having the same sequence number as the tag bit block has not been received previously, it is determined, based on a value of a sequence number start field of the tag bit block, whether the bit block segment includes the first data bit block corresponding to the sequence number. If the bit block segment includes the first data bit block, the bit block segment may be sent upward, for example, to an Ethernet layer for upper layer processing. If the bit block segment does not include the first data bit block, the bit block segment may be temporarily stored.

If the bit block having the same sequence number as the tag bit block has been received previously, it is determined, based on the value of the length field of the tag bit block, whether the bit block segment is a bit block segment expected to be received. If the bit block segment is a bit block segment expected to be received, the bit block segment may be sent upward. If the bit block segment is not a bit block segment expected to be received, the bit block segment may be temporarily stored.

In a specific embodiment, alternatively, after all data bit blocks of one sequence number are received, a plurality of bit block segments that belong to the same sequence number may be recombined into one bit segment; or only the data bit blocks are recombined, and then recombined bit block segment is sent upward to an Ethernet layer for processing.

In this embodiment of the present disclosure, at a physical layer, one tag bit block is added to a series of bit blocks on a bit block basis to form one bit block segment. The bit block segment may be truncated into a plurality of bit block segments by using a length field of the tag bit block, and each bit block segment includes one tag bit block. In addition, the bit block segment may be routed by using a connection identity field of the tag bit block. A sequence number field of the tag bit block may be used to identify a sequence number corresponding to data bit blocks in the bit block segment. A sequence number start field of the tag bit block may be used to identify whether the data bit blocks in the bit block segment include the first data bit block corresponding to the sequence number, so that bit blocks can be quickly recombined on the receiving node.

In this embodiment of the present disclosure, regardless of whether the value of the length field in the tag bit block is a determined quantity of bit blocks, or is only a preset value, processing manners may be the same for a switching node. In addition, the switching node does not need to perform sorting, either, and a processing manner is very simple.

Figure 7:
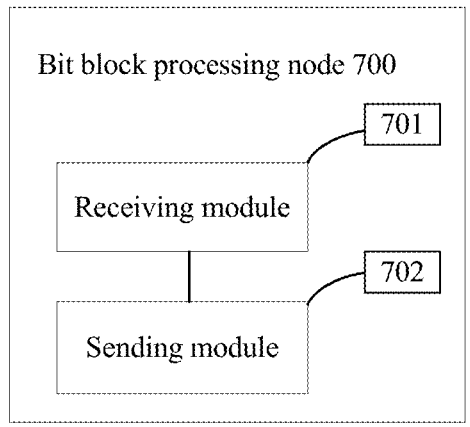
FIG. 7 is a schematic structural diagram of a bit block processing node according to an embodiment of the present disclosure.

FIG. 7 is a schematic structural diagram of a bit block processing node according to an embodiment of the present disclosure. The bit block processing node includes:

a receiving module 701, configured to sequentially receive a first tag bit block and N data bit blocks through a first port, where the first tag bit block includes a first length field; and a sending module 702, configured to: sequentially send the first tag bit block and M data bit blocks in the N data bit blocks through a second port, and further sequentially send a second tag bit block and L data bit blocks in the remaining N−M data bit blocks of the N data bit blocks through the second port, where the second tag bit block includes a second length field, a value of the first length field is greater than a value of the second length field by M, and M, N, and L are all integers greater than or equal to 0.

In a possible design, the receiving module 701 is further configured to obtain a third tag bit block and O data bit blocks, where O is an integer greater than or equal to 0. Before sequentially sending the second tag bit block and the L data bit blocks in the remaining N−M data bit blocks of the N data bit blocks through the second port, the sending module is further configured to sequentially send the third tag bit block and the O data bit blocks through the second port.

In a possible design, the first tag bit block further includes a first connection identity field, the node further includes a processing module, and the processing module is configured to determine the second port based on the first connection identity field.

In a possible design, the second tag bit block further includes a second connection identity field, and a value of the first connection identity field is the same as a value of the second connection identity field.

In a possible design, the first tag bit block further includes a first sequence number field, the second tag bit block further includes a second sequence number field, and a value of the first sequence number field is the same as a value of the second sequence number field.

In a possible design, the first tag bit block further includes a first sequence number start field used to identify whether the first data bit block in the N data bit blocks is the first data bit block corresponding to a sequence number, and the second tag bit block further includes a second sequence number start field used to identify whether the first data bit block in the L data bit blocks is the first data bit block corresponding to the sequence number.

In a possible design, the node further includes a processing module; and when the sending module sequentially sends the first tag bit block and the M data bit blocks in the N data bit blocks through the second port, the processing module is configured to: store the value of the first length field, and subtract 1 from the stored value of the first length field each time one data bit block is sent.

In a possible design, the value of the second length field is the value of the first length field stored by the processing module.

In a possible design, if the stored value of the first length field is 0, the stored first length field is released.

In a possible design, the receiving module is configured to sequentially receive the first tag bit block, the N data bit blocks, and a first tag end bit block through the first port.

After the sending module sends the first tag end bit block through the second port, the processing module is further configured to release the stored first length field.

Figure 8:
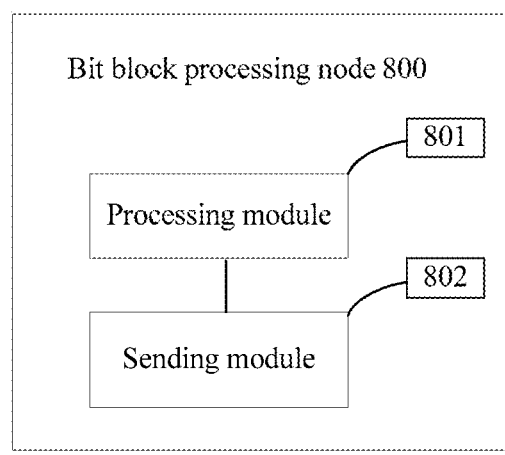
FIG. 8 is a schematic structural diagram of another bit block processing node according to an embodiment of the present disclosure.

FIG. 8 is a schematic structural diagram of a bit block processing node according to an embodiment of the present disclosure. The bit block processing node includes:

a processing module 801, configured to: generate a first tag bit block, where the first tag bit block includes a first length field; and further obtain N to-be-sent data bit blocks; and a sending module 802, configured to sequentially send the first tag bit block and the N data bit blocks through a first port.

In a possible design, a value of the first length field is N.

In a possible design, a value of the first length field is a first preset value, and the sequentially sending the first tag bit block and the N data bit blocks through a first port includes: sequentially sending the first tag bit block, the N data bit blocks, and a first tag end bit block through the first port.

In a possible design, the first tag bit block further includes at least one of a first connection identity field, a first sequence number field, and a first sequence number start field, the first connection identity field is used to route the first tag bit block and the N data bit blocks, the first sequence number field is used to identify a sequence number corresponding to the N data bit blocks, and the first sequence number start field is used to identify whether the first data bit block in the N data bit blocks is the first data bit block corresponding to the sequence number.

In a possible design, the first tag bit block further includes a first sequence number field, the first tag end bit block further includes a first end sequence number field, and a value of the first sequence number field is the same as a value of the first end sequence number field.

Figure 9:
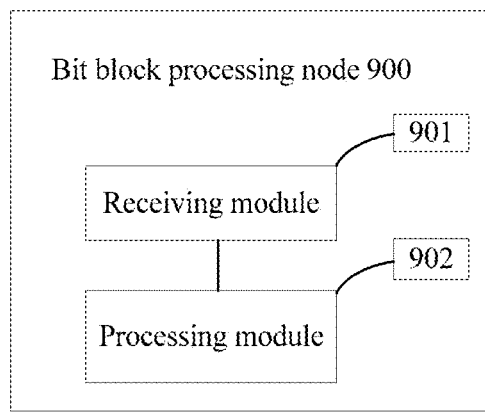
FIG. 9 is a schematic structural diagram of still another bit block processing node according to an embodiment of the present disclosure.

FIG. 9 is a schematic structural diagram of a bit block processing node according to an embodiment of the present disclosure. The bit block processing node includes:

a receiving module 901, configured to sequentially receive a first tag bit block and N data bit blocks, where the first tag bit block includes a first length field; and further sequentially receive a second tag bit block and M data bit blocks, where the second tag bit block includes a second length field; and a processing module 902, configured to associate the N data bit blocks with the M data bit blocks if a value of the first length field is greater than a value of the second length field by N.

In a possible design, the first tag bit block further includes a first sequence number field, the second tag bit block further includes a second sequence number field, and the processing module is specifically configured to: if the value of the first length field is greater than the value of the second length field by N, and a value of the first sequence number field is the same as a value of the second sequence number field, associate the N data bit blocks with the M data bit blocks.

In a possible design, the first tag bit block further includes a first sequence number start field, the second tag bit block further includes a second sequence number start field, and the processing module is further configured to determine the first data bit block corresponding to a sequence number based on a value of the first sequence number start field and a value of the second sequence number start field.

In a possible design, the processing module is further configured to: if the value of the second length field is M, determine that the last data bit block in the M data bit blocks is the last data bit block corresponding to the sequence number.

In a possible design, the receiver is specifically configured to sequentially receive the second tag bit block, the M data bit blocks, and a second tag end bit block, and the processing module is further configured to determine, based on the second tag end bit block, that the last data bit block in the M data bit blocks is the last data bit block corresponding to the sequence number.

The apparatus is configured to execute the foregoing method embodiment. An implementation principle and a technical effect of the apparatus are similar to those in the foregoing method embodiment, and no details are repeated herein. In addition, the sending module in the foregoing embodiment may be a transmitter, the receiving module may be a receiver, and the processing module may be a processor, and no details are repeated herein.

It should be noted that division of the modules in the foregoing device is merely logical function division. During actual implementation, all or some of the modules may be integrated into one physical entity, or may be physically separated. In addition, all of these modules may be implemented in a form of software invoked by using a processing element or may be implemented in a form of hardware, or some modules may be implemented in a form of software invoked by using a processing element and some modules may be implemented in a form of hardware. For example, the sending module may be a separately disposed element, or may be integrated into a chip of the foregoing device for implementation. In addition, the sending module may alternatively be stored in a memory of the device in a form of program code and invoked by a processing element of the device to execute a function of the sending module. This is similar to implementation of other modules. In addition, all or some of these modules may be integrated together, or may be implemented separately. The processing element herein may be an integrated circuit having a signal processing capability. In an implementation process, the steps in the foregoing methods or the foregoing modules can be implemented by using a hardware integrated logical circuit in the processing element, or by using instructions in a form of software.

For example, the foregoing modules may be configured as one or more integrated circuits for performing the foregoing methods, for example, one or more application-specific integrated circuits (ASIC), one or more microprocessors (e.g., Digital Signal Processor, DSP), or one or more field programmable gate arrays (FPGA). For another example, when one of the foregoing modules is implemented by using the processing element to schedule the program code, the processing element may be a general-purpose processor, for example, a central processing unit (CPU), or another processor that can invoke the program code. For another example, these modules may be integrated together and implemented in a form of a System-On-a-Chip (SOC).

It should be understood that the first, second, third, and fourth, and the numbers are merely used for differentiation for ease of description, and are not construed as a limitation on the scope of the embodiments of the present disclosure.

Figure 10:
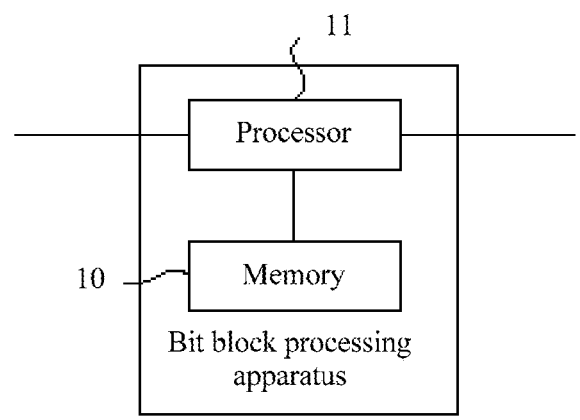
FIG. 10 is a schematic structural diagram of a bit block processing apparatus according to an embodiment of the present disclosure.

FIG. 10 is a schematic structural diagram of a bit block processing apparatus according to an embodiment of the present disclosure. The apparatus may be the node 101, 102, 103, 104, 105, or 106 in FIG. 1. As shown in FIG. 10, the apparatus includes a memory 10 and a processor 11.

The memory 10 may be an independent physical unit, and may be connected to the processor 11 by using a bus. The memory 10 and the processor 11 may alternatively be integrated together by using hardware and the like.

The memory 10 is configured to store a program for implementing the foregoing method embodiments or the modules in the embodiments shown in FIG. 7 to FIG. 9. The processor 11 invokes the program to perform operations in the method embodiments.

Optionally, when some or all of the service data transmission methods in the foregoing embodiments are implemented by using software, the apparatus may alternatively include only the processor. The memory configured to store the program is located outside an access device, and the processor is connected to the memory by using a circuit/cable, to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logical device (CPLD), a field programmable gate array (FPGA), generic array logic (GAL), or any combination thereof.

The memory may include a volatile memory, for example, a random-access memory (RAM), and may also include a non-volatile memory, for example, a flash memory, a hard disk drive (HDD), or a solid-state drive (SSD); or the memory may include a combination of memories of the foregoing categories.

An embodiment of the present disclosure further provides a computer storage medium that stores a computer program, and the computer program is configured to perform the service data transmission method provided in the foregoing embodiments.

An embodiment of the present disclosure further provides a computer program product including an instruction, and when the computer program product runs on a computer, the computer performs the service data transmission method provided in the foregoing embodiments.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device, and the computer program product according to the embodiments of the present disclosure. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of the another programmable data processing device generate an apparatus configured to implement a specific function in one or more processes in the flowcharts and/or in one or more blocks in the block diagrams.

These computer program instructions may alternatively be stored in a computer readable memory that can instruct the computer or another programmable data processing device to work in a particular manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating processing performed by the computer. Therefore, the instructions executed on the computer or the another programmable device provide steps for implementing a specified function in one or more processes in the flowcharts and/or in one or more blocks in the block diagrams.

What is claimed is:

1. A bit block processing method, comprising:
    sequentially receiving a first tag bit block and N data bit blocks through a first port, wherein the first tag bit block comprises a first length field;
    sequentially sending the first tag bit block and M data bit blocks in the N data bit blocks through a second port; and
    sequentially sending a second tag bit block and L data bit blocks in a remaining N–M data bit blocks of the N data bit blocks through the second port, wherein the second tag bit block comprises a second length field, a value of the first length field is greater than a value of the second length field by M, and M, N, and L are all integers greater than or equal to one.

2. The method according to claim 1, before the sequentially sending the second tag bit block and the L data bit blocks in the remaining N–M data bit blocks of the N data bit blocks through the second port, further comprising:
    obtaining a third tag bit block and O data bit blocks, wherein O is an integer greater than or equal to 0; and
    sequentially sending the third tag bit block and the O data bit blocks through the second port.

3. The method according to claim 1, wherein the first tag bit block further comprises a first connection identity field, and before the sequentially sending the first tag bit block and the M data bit blocks in the N data bit blocks through the second port, the method further comprises:
    determining the second port based on the first connection identity field.

4. The method according to claim 3, wherein the second tag bit block further comprises a second connection identity field, and a value of the first connection identity field is the same as a value of the second connection identity field.

5. The method according to claim 1, wherein the first tag bit block further comprises a first sequence number field, the second tag bit block further comprises a second sequence number field, and a value of the first sequence number field is the same as a value of the second sequence number field.

6. The method according to claim 5, wherein the first tag bit block further comprises a first sequence number start field that identifies whether a first data bit block in the M data bit blocks is the first data bit block corresponding to the value of the first sequence number field, and the second tag bit block further comprises a second sequence number start field that identifies whether a first data bit block in the L data bit blocks is the first data bit block corresponding to the value of the second sequence number field.

7. The method according to claim 1, when the first tag bit block and the M data bit blocks in the N data bit blocks are sequentially sent through the second port, further comprising:
    storing the value of the first length field; and
    subtracting 1 from the stored value of the first length field each time one data bit block is sent and updating the stored value of the first length field.

8. The method according to claim 7, wherein the value of the second length field is the stored value of the first length field after sequentially sending the M data bit blocks.

9. The method according to claim 7, wherein if the stored value of the first length field is 0, the first length field is released.

10. The method according to claim 7, wherein the sequentially receiving the first tag bit block and the N data bit blocks through the first port comprises: sequentially receiving the first tag bit block, the N data bit blocks, and a first tag end bit block through the first port; and
    after the sequentially sending the second tag bit block and the L data bit blocks in the remaining N–M data bit blocks of the N data bit blocks through the second port, the method further comprises:
    after the first tag end bit block is sent through the second port, releasing the first length field.

11. A bit block processing method, comprising:
    generating a first tag bit block, wherein the first tag bit block comprises a first length field, wherein a value of the first length field is a first preset value;
    obtaining N to-be-sent data bit blocks, wherein N is an integer greater than or equal to one; and sequentially sending the first tag bit block, the N to-be-sent data bit blocks, and a first tag end bit block through a first port, wherein the first tag bit block further comprises at least one of a first connection identity field, a first sequence number field, and a first sequence number start field, the first connection identity field is used to route the first tag bit block and the N to-be-sent data bit blocks, the first sequence number field is used to identify a sequence number corresponding to the N to-be-sent data bit blocks, and the first sequence number start field is used to identify whether a first data bit block in the N to-be-sent data bit blocks is the first data bit block corresponding to the sequence number.

12. The method according to claim 11, wherein the first tag bit block further comprises a first sequence number field, the first tag end bit block further comprises a first end sequence number field, and a value of the first sequence number field is the same as a value of the first end sequence number field.

13. A bit block processing method, comprising:
sequentially receiving a first tag bit block and M data bit blocks, wherein the first tag bit block comprises a first length field;
sequentially receiving a second tag bit block and L data bit blocks, wherein the second tag bit block comprises a second length field; and
associating the M data bit blocks with the L data bit blocks if a value of the first length field is greater than a value of the second length field by M, wherein M and L are integers greater than or equal to one.

14. The method according to claim 13, wherein the first tag bit block further comprises a first sequence number field, the second tag bit block further comprises a second sequence number field, and the associating the M data bit blocks with the L data bit blocks if the value of the first length field is greater than the value of the second length field by M comprises:
if the value of the first length field is greater than the value of the second length field by M, and a value of the first sequence number field is the same as a value of the second sequence number field, associating the M data bit blocks with the L data bit blocks.

15. The method according to claim 14, wherein the first tag bit block further comprises a first sequence number start field, the second tag bit block further comprises a second sequence number start field, and the method further comprises:
determining a first data bit block corresponding to the first sequence number field based on a value of the first sequence number start field and a value of the second sequence number start field.

16. The method according to claim 15, further comprising:
if the value of the second length field is L, determining that a last data bit block in the L data bit blocks is the last data bit block corresponding to the first sequence number field.

17. The method according to claim 15, wherein the sequentially receiving a second tag bit block and L data bit blocks comprises:
sequentially receiving the second tag bit block, the L data bit blocks, and a second tag end bit block, and determining, based on the second tag end bit block, that a last data bit block in the L data bit blocks is the last data bit block corresponding to the first sequence number field.

* * * * *